United States Patent
Miller et al.

(10) Patent No.: US 8,373,655 B2
(45) Date of Patent: Feb. 12, 2013

(54) ADAPTIVE ACCELERATION OF MOUSE CURSOR

(75) Inventors: Howard A. Miller, Saratoga, CA (US); Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1332 days.

(21) Appl. No.: 11/620,545

(22) Filed: Jan. 5, 2007

(65) Prior Publication Data

US 2008/0168364 A1    Jul. 10, 2008

(51) Int. Cl.
*G06G 3/33* (2006.01)
(52) U.S. Cl. ........................................ 345/157; 715/762
(58) Field of Classification Search .................. 345/156, 345/157, 160; 715/762
See application file for complete search history.

(56) References Cited

U.S. PATENT DOCUMENTS

| | | | | |
|---|---|---|---|---|
| 5,508,717 A | * | 4/1996 | Miller | 715/858 |
| 5,598,183 A | * | 1/1997 | Robertson et al. | 715/856 |
| 5,917,486 A | * | 6/1999 | Rylander | 715/764 |
| 6,559,873 B1 | * | 5/2003 | Dawkins et al. | 715/862 |
| 7,362,331 B2 | | 4/2008 | Ording | |
| 8,068,094 B2 | * | 11/2011 | Sakurai et al. | 345/157 |
| 2002/0089505 A1 | | 7/2002 | Ording | |
| 2003/0067442 A1 | * | 4/2003 | Bates et al. | 345/157 |
| 2006/0066582 A1 | | 3/2006 | Lyon et al. | |
| 2006/0066588 A1 | | 3/2006 | Lyon et al. | |
| 2006/0238495 A1 | * | 10/2006 | Davis | 345/156 |

\* cited by examiner

*Primary Examiner* — Quan-Zhen Wang
*Assistant Examiner* — Yuk Chow
(74) *Attorney, Agent, or Firm* — Dorsey & Whitney LLP (57) ABSTRACT

Disclosed herein are methods and systems for providing a user interface (UI) having a selector controllable by a physical input device. The response of the selector is adaptively adjusted to facilitate executing desired operations within the UI. A response factor defines how far the selector moves for a given movement of the physical input device. The response factor is increased so the selector can be moved a large distance, but is dynamically decreased to provide fine-tuned control of the selector for selecting densely grouped screen elements. Screen elements can be endowed with gravity, making them easy to select, or with anti-gravity, making them more difficult to select. The disclosure methods also provide tactile feedback such as vibration or braking of the physical input device to assist a user in executing desired operations.

18 Claims, 6 Drawing Sheets

ADAPTIVE ACCELERATION OF MOUSE CURSOR

FIELD OF THE INVENTION

The invention relates to manipulating a selector within a user interface (UI) via a physical input device. More specifically adaptive adjustment of how a selector responds to input by a physical input device is disclosed.

BACKGROUND

The use of a physical input device to manipulate a selector within a UI of a computing device is familiar. Examples include a UI having a cursor or pointer that can be manipulated using a mouse, joystick, track ball, touch pad, etc. Other examples are discussed in this disclosure. As the capability of computing devices increases, UIs for such devices contain a greater density of information in the form of icons and other screen elements that can be selected by a user. As the density of screen elements increases, a user must exert more care in using the physical input device to select desired elements and the chance of a user inadvertently selecting an undesired element increases. This problem is exacerbated with small displays, such as those of portable devices and the like.

Large and/or multiple displays are becoming more common with desktop computing devices. However, large displays do not completely solve the difficulties associated with selecting a desired screen element from among densely arranged screen elements. For one, users and designers generally find a way of filling all available space with screen elements, so that, even as the area of displays increase, so do the number of screen elements such that the density of screen elements typically remains great. Additionally, navigating a selector within a large and/or multiple screens can be difficult because the selector must traverse large areas. Thus, it might require more and/or larger manipulations of the physical input device to move the selector from one side of a screen to the other. A response factor of the selector to movement of the physical input device can be adjusted such that the selector moves a greater distance per a given movement of the physical input device. However, this makes it more difficult to execute fine-control operations with the selector, such as selecting a desired screen element from among densely grouped elements. Thus, there is a need in the art for methods of navigating within a densely packed and/or large area UI using a selector controlled by a physical input device.

SUMMARY

The present disclosure provides methods of controlling a selector within a UI using a physical input device, wherein the response of the selector to movement of the input device is adaptively adjusted depending on the environment of the selector. A response factor of the selector can be increased to facilitate moving the selector across a large distance with less movement of the input device. The factor can be adaptively decreased to facilitate fine-control operations, such as selecting a desired screen element. According to one embodiment, a selector (cursor) is manipulated in a UI (presentation area) where the selector is used for navigating presented matter in the UI. A first relationship (e.g., selector response factor or speed) is defined between user manipulation of a physical input device (control device) and movement of the selector in the UI. This first relationship (e.g., selector response factor or speed) is altered based upon a second relationship between the selector and the UI. In general, the second relationship between the selector and the UI alters the first relationship (e.g., selector response or speed) if one or more selectable user interface items of the UI having a defined special relationship with the selector. In one example, one or more properties are associated with screen elements that cause the response factor of the selector to be adjusted when the selector is within proximity of the screen element. Thus, the screen element can be a selectable user interface item, and the defined special relationship of the screen element with the selector can be an attractive or repulsive property of the screen element relative to the proximity of the selector to the screen element. In this way, the attractive or repulsive property of the screen element may adjust the selector response factor or speed such that it will be easier to select the screen element, i.e., the screen element may be rendered "attractive" to the selector. Likewise, a screen element can be rendered "repulsive" to the selector such that it will be difficult to place the selector on the screen element. As disclosed herein, the first relationship between defined between user manipulation of a physical input device (control device) and movement of the selector (cursor) in a UI (presented matter) can include, but is not limited to, selector response factor or speed. As disclosed herein, the second relationship or defined special relationship of the presented matter or screen element to the selector or cursor can include, but is not limited to, an attractive or repulsive property of the screen element relative to the proximity of the selector to the screen element, and whether a selectable screen element is present or absent (e.g., an absence of any selectable user interface items within proximity to the selector), for example.

Another feature of the disclosure provides tactile feedback via the physical input device to facilitate a user in executing desired operations within the UI. For example, a user might feel a tactile barrier to selecting particular screen elements that are designated "low probability," i.e., that are not likely to be selected. Likewise, a user might sense a vibration or barrier when the selector is at the edge of a window. These and other aspects of the disclosure will be apparent in view of the Description and Drawings.

DETAILED DESCRIPTION

Figure 1:
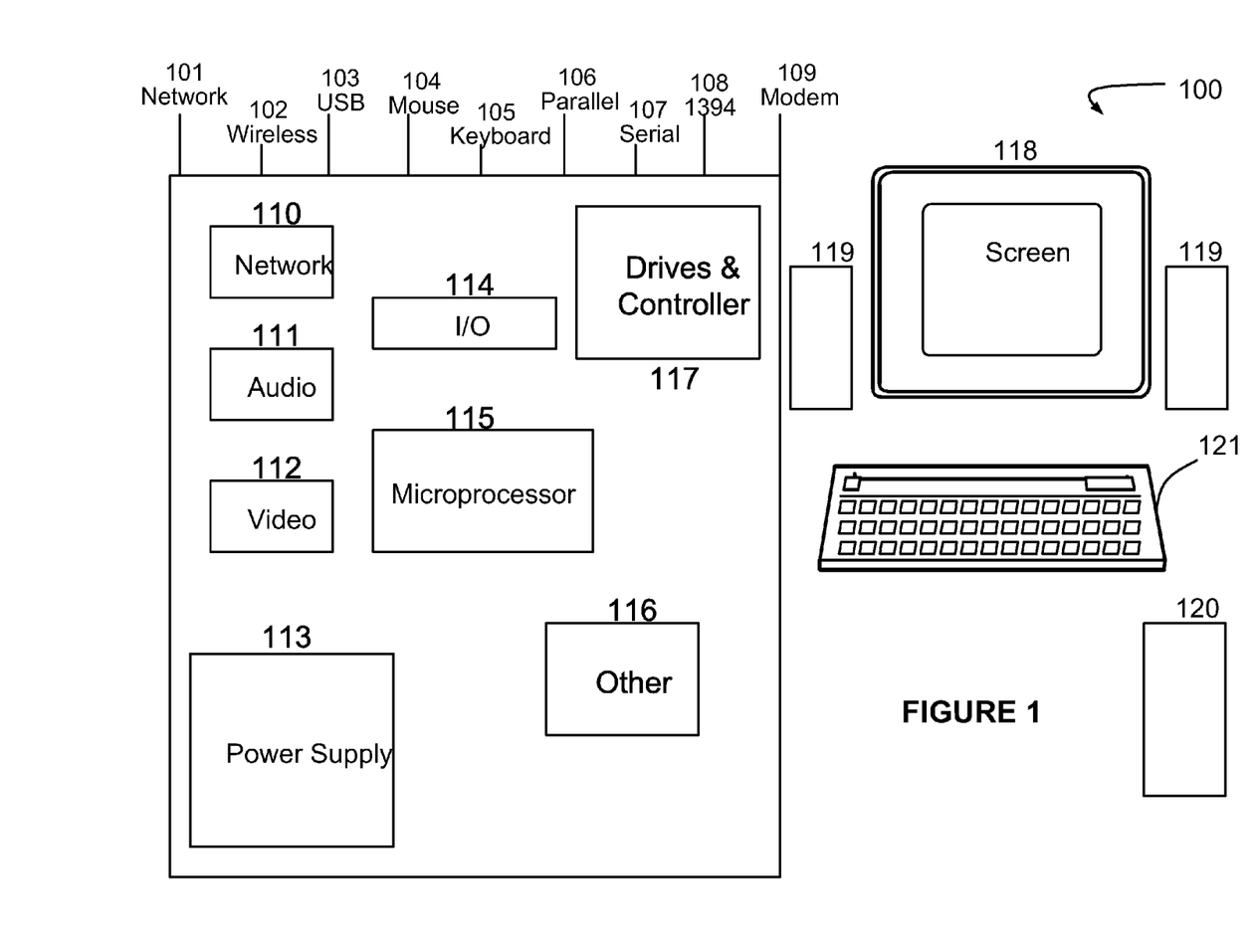
FIG. 1 shows exemplary hardware of a desktop device.

While the techniques described herein may be embodied in virtually any structural context, we shall describe some example structural embodiments for illustrative purposes. Referring now to FIG. 1, computer 100 is an example of a device that a user may use in conjunction with many of the disclosed techniques. Computer 100 is an ordinary computer, like a personal computer, but not intended to be limited as such. Computer 100 has one or more microprocessors 115 and accompanying chipset (not shown) at the heart of the system. The chipset may include items such as network unit 110, audio unit 111 and many I/O functions such as those that might be embodied in I/O unit 114. Of course, any of these functions, or sub-functions, may be implemented individually or collectively within a chipset or outside. Computer 100 also has power supply 113 for adapting and supplying power. Computer 100 may have any variety of optical and magnetic drives and the appropriate controllers to use those drives such as IDE, ATA or SCSI controllers. For user accessibility, computer 100 has monitor 118, speakers 119, keyboard 121, and mouse 120 and may have alternative or additional input devices such as a touch pad, touch screen, tablet, and/or a multi-touch input device. Finally, computer 100 may connect with any manner of other items (such as other devices carrying corresponding data items) through various ports (Network 101, wireless 102, USB 103, parallel 106, serial 107, 1394 108 or modem 109).

Figure 2:
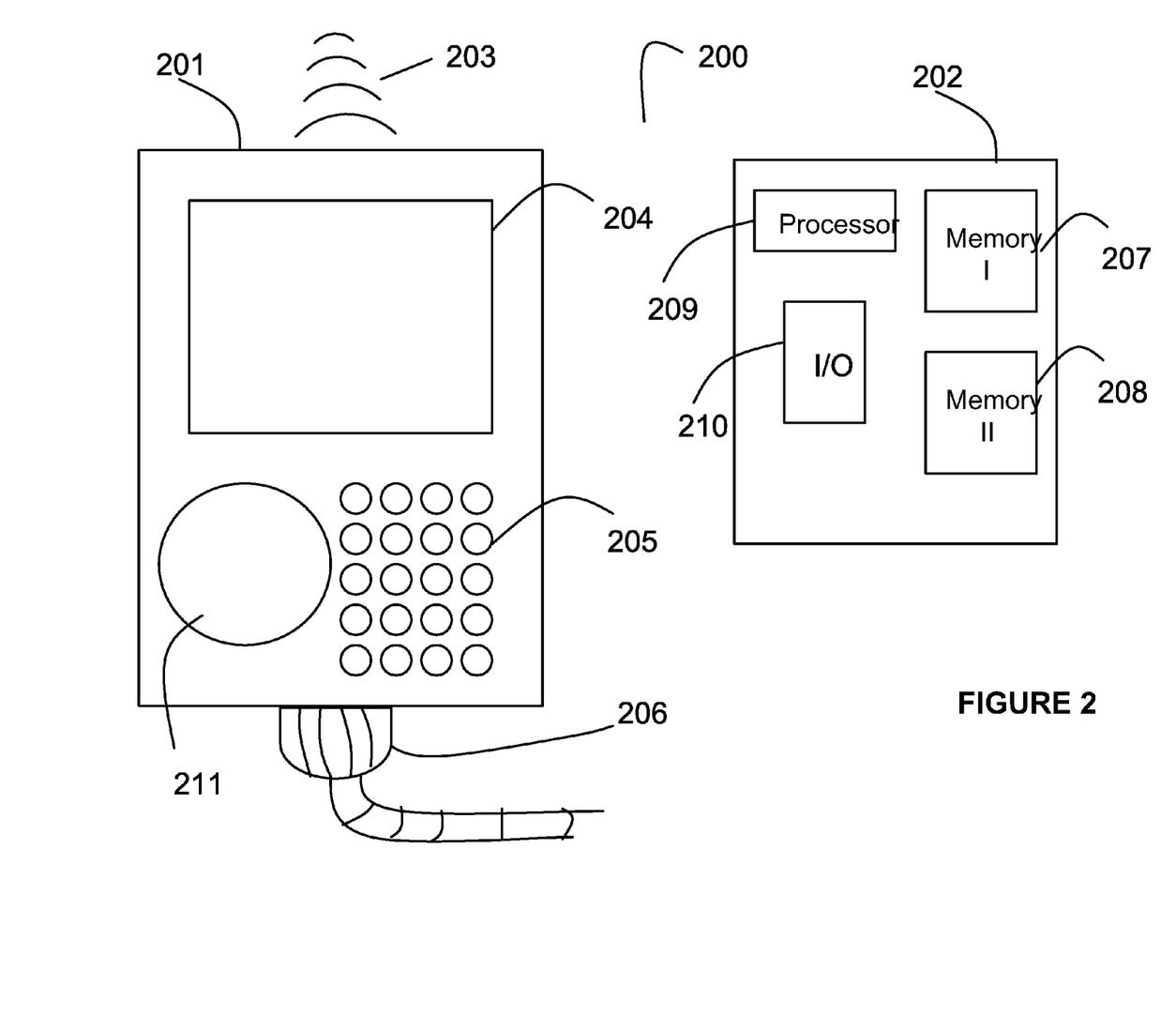
FIG. 2 is exemplary hardware of a portable device.

FIG. 2 illustrates a sample portable device such as a PDA or telephone handset as another illustration of a device that a user may use in conjunction with many of the disclosed techniques. Front view 201 of device 200 shows screen 204 that may be used for viewing or accessing data as well as inputting data (in the case of a touch-sensitive or otherwise input-equipped screen). Keypad 205 may also be used for data input such as by alpha-numerics or otherwise. A directional input element 211, such as a click wheel or touch pad can be used to control a cursor in a UI of device 200. Wired connection 206 may be used for power and/or data transport. Wireless port 203 may be infrared, Bluetooth, 802.11 or any other wireless transmission for moving data in and out of device 200. Turning now to inside 202 of device 200, we see that a processor 209 is present for performing processing tasks. The inventive embodiments may incorporate any type of device so processor 209 may be any type of microprocessor or controller or aggregate of components that perform the function of running software for effecting one or more of the device functions. Device 200 may also have two or more types of memory for storing data and programs as shown by memories 207 and 208. These memories may be of any type such as magnetic memory, optical memory or any of the many types of silicon-based memory such as SRAM and DRAM. Finally, device 200 may have components 210 to support I/O functionality such as that potentially embodied in wired connection 206 and wireless connection 203.

Transitioning from sample hardware, we shall now discuss general software. In particular, referring to FIG. 3, there is shown a software stack intended to be illustrative of the software architecture. Like our hardware examples, this structure is not intended to be exclusive in any way but rather illustrative. This is especially true for layer-type diagrams, which software developers tend to express in somewhat differing ways. In this case, we express layers starting with the O/S kernel so we have omitted lower level software and firmware. Our notation is generally intended to imply that software elements shown in a layer use resources from the layers below and provide services to layers above. However, in practice, all components of a particular software element may not behave entirely in that manner.

Figure 3:
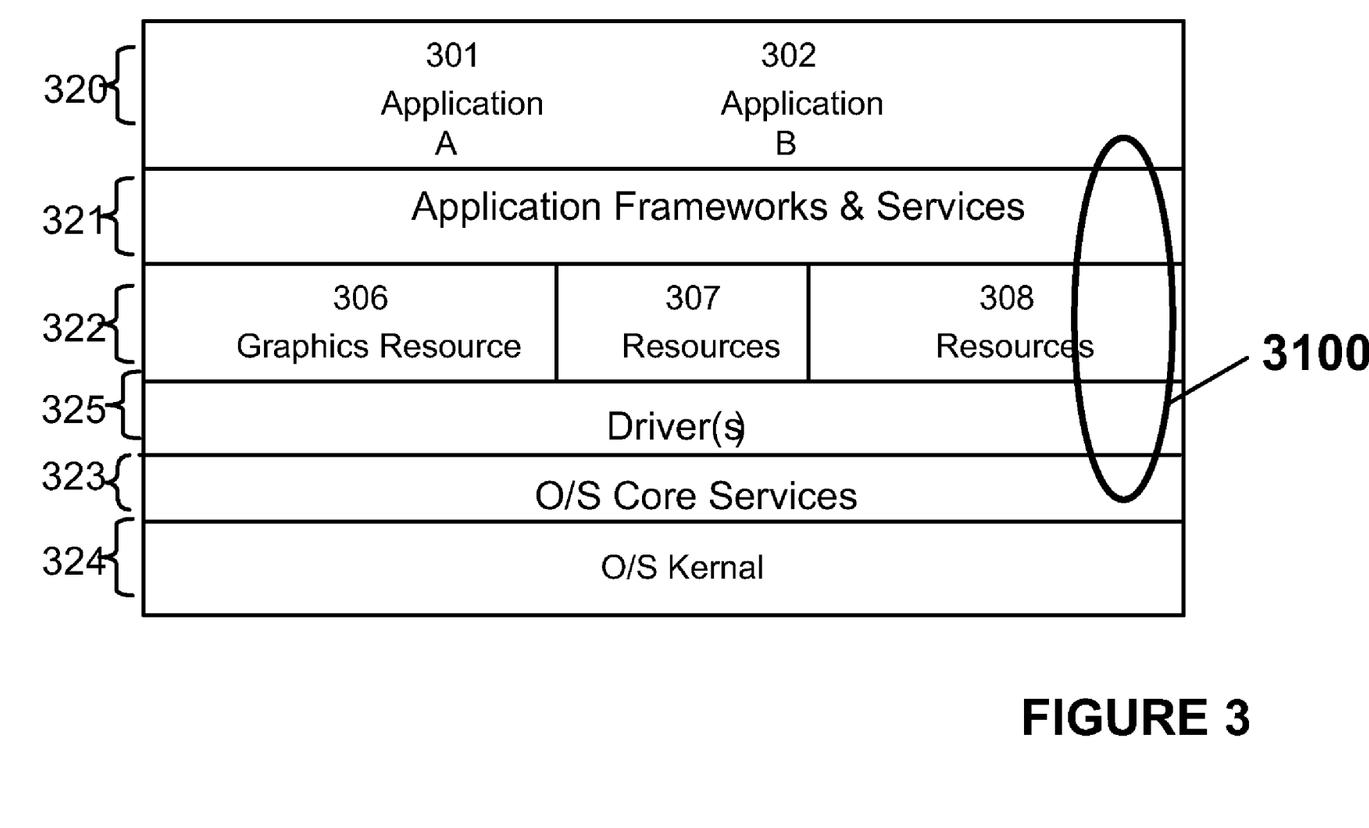
FIG. 3 is an exemplary software stack.

With those caveats, we see in FIG. 3 two layers 324 and 323 dedicated to the operating system kernel and core services respectively. Generally above core services layer 323 there is a driver layer 325 and software layers (322 and 321) for providing higher level resources and services to applications in the application layer 320. Area 3100 shows generally where processes implementing the cursor control function may be implemented. The cursor control function might be implemented through driver functions, core services, and/or software layers. Alternatively, the function may have components in two or more layers.

As mentioned in the Summary, the present disclosure provides methods and implementations that assist users to navigate within a UI using a physical input device. As the density of information contained within UI displays increase, navigating within the UI becomes more difficult and users must assert more attention and care to select desired areas of a display and/or to avoid undesired areas. Also, as the size of UI displays increase, e.g., because of larger or multiple monitors, it is more difficult to navigate around the screen(s). To move a mouse-driven cursor from one side of a large display to another, a user might have to repeatedly drag and pick up the mouse. Aspects of the present disclosure assist a user in selecting desired icons and in efficiently navigating around large UI displays.

Figure 4:
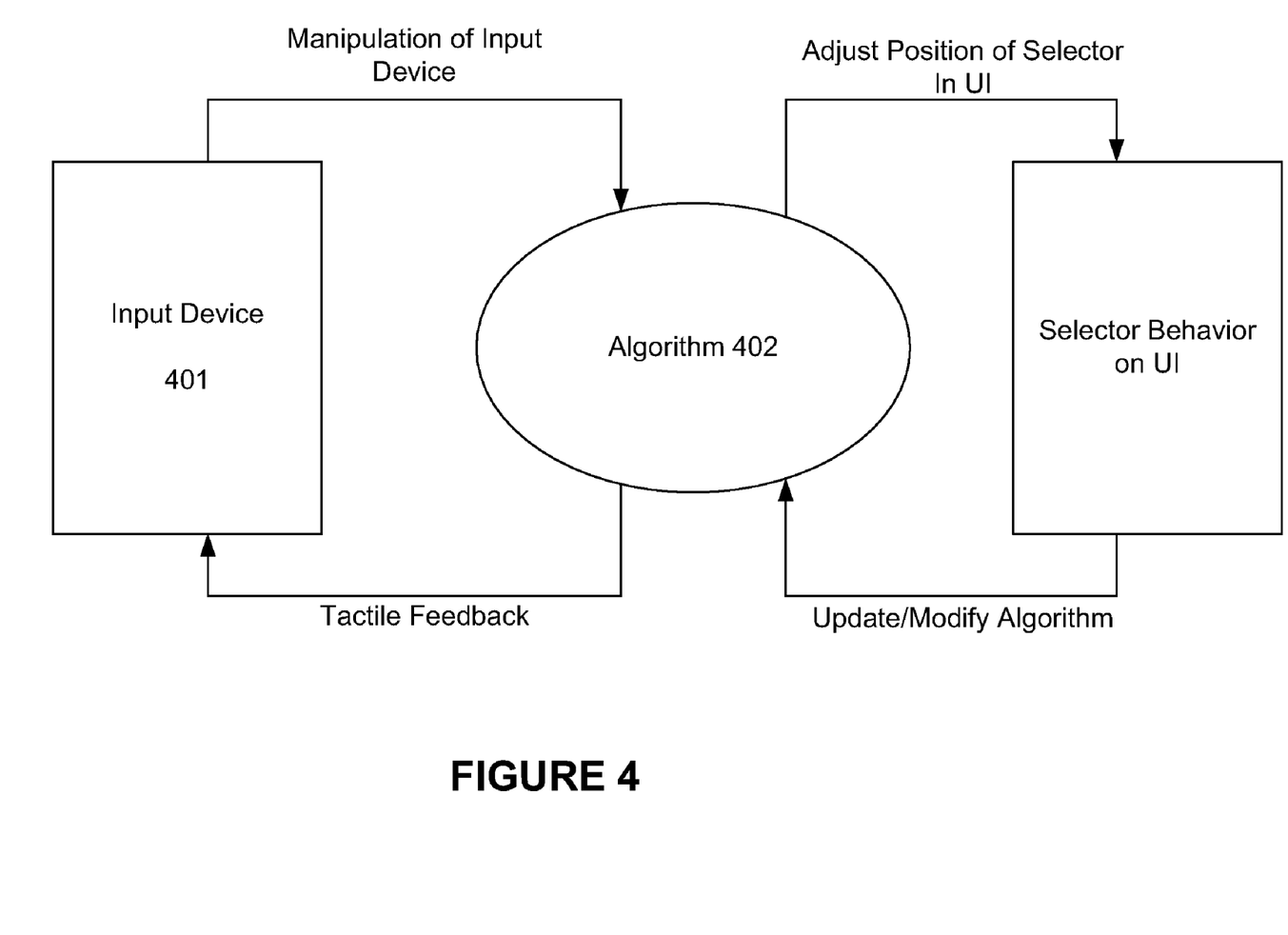
FIG. 4 schematically illustrates a method of adaptively adjusting the response of a selector to movement of a physical input device.

FIG. 4 illustrates aspects of the present disclosure. A user physically manipulates an input device 401 to communicate with a UI of a computing device. Examples of input devices include a mouse, touch pad, click wheel, joy stick, trackball, or multi-touch input device, etc. Manipulation of the physical input device translates to movement of a selector within the UI. The selector may be a cursor, pointer, selector bar, or the like or can be a finger or finger gesture, etc. An algorithm 402 evaluates the physical movement of the input device and determines how to assist the user in performing the desired action. For example, if the input device controls the motion of a pointer on the screen of a UI, the algorithm can determine where on the screen the user is attempting to position the pointer by evaluating one or more properties of how the input device is manipulated. Such properties may include the speed, acceleration, and/or direction of motion of the input device. The evaluation may also include information regarding elements of the UI, such as the frequency the elements are accessed or if such elements are likely to be accessed within the present operating context. Thus, according to some embodiments, properties of the UI update and/or modify how the algorithm predicts the user's intentions. Having predicted the user's intent, the algorithm can assist the user in executing the desired task, for example by adjusting the response of the UI in a way that facilitates the desired action and/or by providing feedback to the user via the input device to provide the user greater control of the input device. Alternatively, once the algorithm determines what the desired action is, the algorithm may take control from the user and cause the desired action to be performed. These aspects are described in more detail below in the context of exemplary scenarios.

Figure 5:
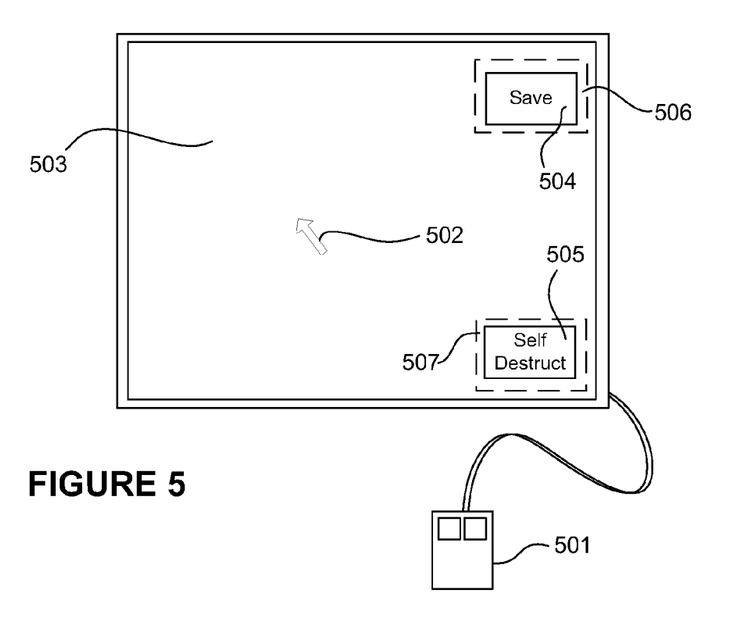
FIG. 5 illustrates a UI having screen elements endowed with gravity and anti-gravity.

One exemplary scenario is illustrated in FIG. 5, wherein a mouse 501 controls a cursor 502 on a screen 503. Additional components of a computing device such as a CPU, keyboard, etc. are omitted from FIG. 5 for the sake of clarity. Screen 503 includes two icons 504 and 505. Icon 504 is designated as a high probability icon, i.e., an icon that a user is likely to select. Such a designation may be based on a user defined setting, user history, or an evaluation of the particular operating context, for example. Icon 505 is designated as a low probability icon.

According to one embodiment high probability icon 504 is surrounded by a gravity field 506. When cursor 502 is placed within gravity field 506, the algorithm assumes that the user desires to select icon 504 and assists the user in doing so, for example by either "sucking" the cursor directly to icon 504 or by enhancing the cursor response in the direction of icon 504. Likewise, low probability icon 505 may be surrounded by an anti-gravity field 507. Anti-gravity field 507 can "repel" cursor 502 from icon 505 by decreasing the sensitivity of the cursor response to mouse movements in the direction of icon 505 so that a user would have to make larger and more directed mouse movements to select icon 505. Additionally or alternatively, physical tactile feedback features as described below can be used to "repel" cursor 502 from icon 505. Gravity and/or anti-gravity fields can be used with any feature of a UI screen, such as icons, as shown in FIG. 5, scroll bars, tool bars, docks, window borders and edges, menu bars, URLs, hot corners, form, etc. Essentially anything within the UI that can be clicked on can be endowed with gravity or anti-gravity. Furthermore, the size of the gravity or anti-gravity field can be smaller, larger, or the same as the UI object.

A developer can endow a UI element, such as an icon, with gravity or anti-gravity via an API. A program can analyze the UI and adjust/optimize such assignments based on a variety of factors such as usage, user preferences, etc.

Figure 6:
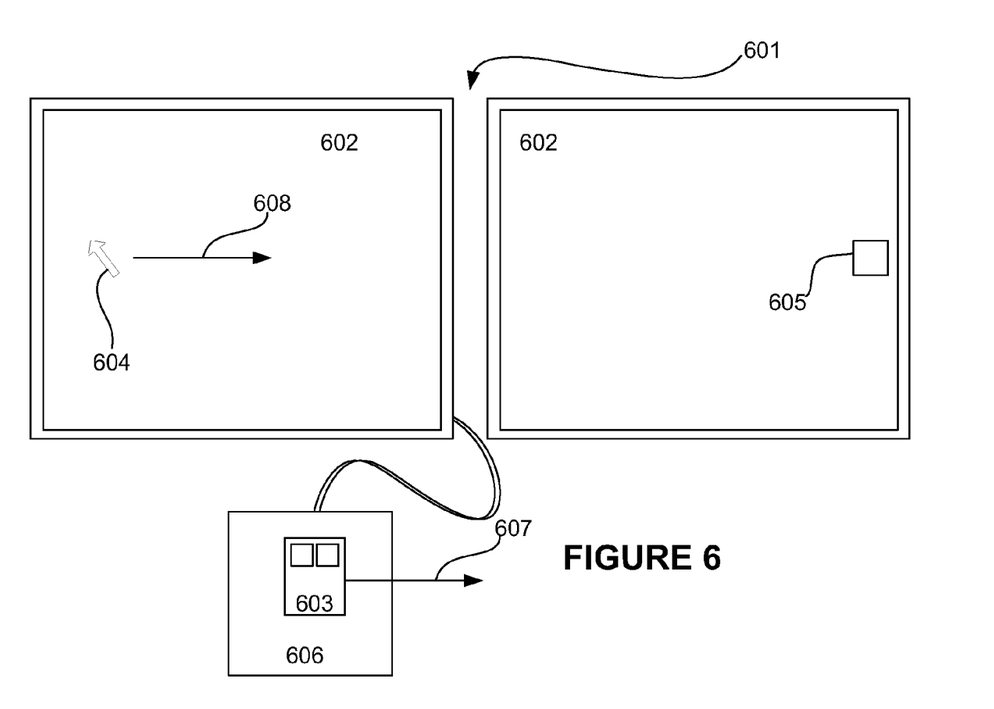
FIG. 6 illustrates a dual display configured to adaptively accelerate a selector.

FIG. 6 illustrates a dual monitor system 601. Because of the large screen area 602, a user attempting to use mouse 603 to move cursor 604 from its present position to icon 605 might have to move and pick up the mouse several times. A small desktop working area such as a mouse pad 606 can exacerbate this difficulty. This same difficulty can arise with any high-area display, such as a large single monitor.

The disclosed method can overcome the difficulty of moving a pointer over large distances by analyzing the movement of the physical input device (i.e., mouse 603 in this example) and determining that the user desires to move the pointer to the other side of the screen. Having made such a determination, the algorithm can adaptively adjust the UI response to facilitate moving the pointer a large distance. For example, the algorithm can analyze the acceleration and/or speed of the motion vector 607 of mouse 603. A slow steady motion vector may indicate that the user only intends to move cursor 604 a short distance. A quick and/or jerky motion may indicate that the user intends to move cursor 604 to the other side of the screen. The algorithm can adjust the response of cursor 604 along vector 608 to facilitate moving cursor 604 a long distance. A user may be able to "toss" cursor 604 from one side of the screen to the other using a quick motion with mouse 603.

Alternatively, the algorithm can adjust the response of the cursor based on the UI, in addition to, or rather than based on motion of the physical input device. For example, if the algorithm senses that a great deal of empty display space exists between the cursor position and an intended target (i.e., there is an absence or sparseness of selectable items in the display space), the algorithm can accelerate the response of the cursor to compensate for the empty space.

According to one embodiment, pointer response is adjusted by adaptively adjusting an acceleration factor for the pointer response to the physical input device (e.g., mouse). The speed at which a pointer moves within the UI may be related to movement of the physical input device by the equation:

Pointer Speed=Mouse Speed×Acceleration Factor

According to another embodiment, pointer response is adjusted by adaptively adjusting an acceleration factor for the pointer response to a finger gesture with a touch or multi-touch physical input device. The speed at which a pointer moves within the UI may be related to a finger gesture by the equation:

Pointer Speed=Finger Speed×Acceleration Factor

The acceleration factor can be adaptively adjusted depending on what and how many screen elements in the UI the pointer is close to. For example, if the pointer is moving at a fast rate (i.e., acceleration factor is large) the acceleration factor could be dynamically decreased as it approaches an area of interest (i.e., an area having a defined quantity or abundance of selectable screen elements or having high gravity items) to facilitate positioning the pointer on icons, scroll bars, etc. To avoid inadvertently selecting low probability areas (e.g., icons endowed with anti-gravity) the acceleration factor could be greatly increased to cause the pointer to "jump over" the low probability area. Alternatively, the acceleration factor could be greatly decreased along the vector between the pointer and the low probability area to cause the pointer to "veer around" the low probability area unless the user exercises increased effort to select the low probability area. Also, the acceleration factor can be increased to facilitate moving the pointer across a large distance (i.e., a distance with an absence or sparseness of items), to the other side of a display, for instance. Broadly stated, these aspects involve adaptively adjusting the acceleration factor of the pointer depending on the context of the pointer within the UI.

Figure 7:
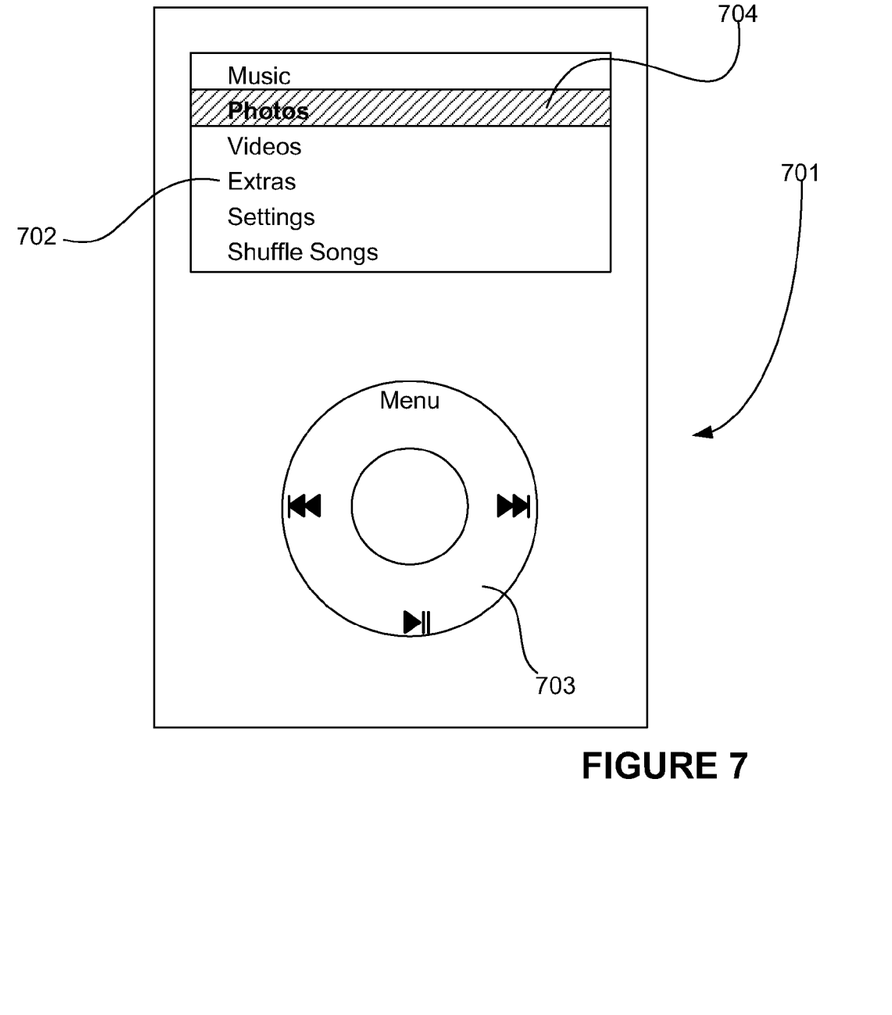
FIG. 7 illustrates a portable entertainment device.

The discussion thus far has primarily concerned moving a cursor on a screen using a mouse as a physical input device. The disclosed methods are applicable to any UI wherein a user manipulates a physical input device to make a selection using a UI. FIG. 7 illustrates a portable entertainment device 701 having a screen 702 and a click wheel 703 as a physical input device. Note that as used herein, reference to movement of a physical input device and similar language includes actuating a click wheel, even though the click wheel does not physically spin, per se. Likewise, terms such as speed and/or acceleration vector can apply to manipulating a click wheel. A user can manipulate click wheel 703 to move selector bar 704 to a desired menu option. The methods described above can be applied to the click wheel-driven device of FIG. 7 to assist a user in selecting desired menu options and avoid inadvertently selecting undesired options. For example, a user may select the "Settings" menu option frequently for a short time after the user acquires the device but then rarely after that. However, the same user might select "Shuffle Songs" frequently on an ongoing basis. Thus the "Settings" option would become a low probability selection and the "Shuffle Songs" option would become a high probability selection. In such a case, a gravity field, as described above, can be applied to the "Shuffle Songs" menu option and an "anti-gravity field can be applied to the "Settings" menu option to aid a user in selecting the "Shuffle Songs" menu option and not inadvertently selecting the "Settings" menu option. This methodology could be applied to any menu of a device as depicted in FIG. 7. For example, particular songs, artists, or genres of music in a music library may be defined as high probability so as to help select these from the library. In general, this methodology can assist a user in navigating through any menu on device 701.

According to another embodiment, an algorithm can determine how far though a menu a user intends to scroll by analyzing how click wheel 703 is manipulated. This is particularly useful for navigating through an extensive stack of selections, such as a music library. Music libraries can contain hundreds or thousands of files and scrolling through such files using click wheel 703 can be time consuming and inconvenient. The algorithm can address this problem by analyzing the speed and/or acceleration with which a user actuates click wheel 703. A slow steady turn may indicate that the user desires to scroll slowly or with a high degree of precision. A quick or sudden turn may indicate that the user desires to quickly scroll through items to a position far down the stack of files. The algorithm can assist the user to scroll quickly through a large stack of files by increasing the speed of scrolling. According to one embodiment, if the algorithm determines that the user intends to scroll through a large number of files, the algorithm can cause the scroll bar to continue scrolling even after the user has lifted his finger from click wheel 703. Thus, with a quick sharp motion, a user can give click wheel 703 a "spin" causing selector bar 704 to continue scrolling through files. The algorithm can cause selector bar 704 to appear to have "momentum" that depends on how quickly and sharply click wheel 703 is manipulated, i.e., a quicker, sharper manipulation will scroll the selector bar 704 further down the stack. Click wheel 703 can in effect be "spun" like a roulette wheel.

In addition to, or rather than analyzing the motion of the physical input device to determine how to adjust the speed of scrolling, the algorithm can analyze the properties of the display itself. For example, the algorithm may accelerate the scrolling rate if the list of files on the display is longer (i.e., the list has a defined quantity or abundance of files). In other words, the scrolling rate of the cursor or selector (first relationship) can be altered if the cursor navigating a list of user interface items in the presented matter of a known length exceeds a threshold or is less than a threshold.

According to a further embodiment, the response of a selector can be adaptively adjusted based on an input signal in addition to the physical input device. For example, a user may press a button on a keyboard while simultaneously manipulating a mouse to adjust how a cursor responds to the mouse. This can provide a fine control and a course control of the cursor, for example. In the context of a click wheel, a user might simultaneously press a button on the device while actuating the click wheel to adjust the scrolling rate or the "stickiness" of the selector bar. Essentially any multi-touch methodology or combination of touches can be used to cause adaptive adjustment of a selector response. Furthermore, the additional input need not be via a user touching an input device, per se, but can be any input signal, for example, the spatial orientation of the device (i.e., how the user holds the device), voice, sound, lighting, temperature, and the like. Furthermore, the algorithm may use these secondary inputs alone to adaptively adjust the selector response or the algorithm may use the secondary inputs in combination to the UI elements, context, history etc. as discussed elsewhere herein.

Where this disclosure refers to a physical input device, the invention contemplates the use of any known manner of such physical input via a user interface. However, one particularly interesting manner of input is a manner involving touch sensitive systems (such as a touch pad or touch sensitive surface (s) used in combination with software to interpret gestures and touches to the sensing surface(s)). Thus, any embodiment calling for user interaction contemplates the potential use of touch sensing of one or multiple finger signals or gestures. Further, such gestures (whether effected with one or multiple fingers) may be augmented in meaning through the use of fusion concepts where sound, light, user proximity or other input mechanisms are interpreted together with such gestures. For purpose of further disclosure of gestures and touch sensing that may be used in connection with disclosed embodiments, reference is made to U.S. patent application Ser. No. 11/232,299, filed Sep. 21, 2005 and entitled "System and Method For Processing Raw Data Of Track Pack Device," and is incorporated herein by reference.

Figure 8:
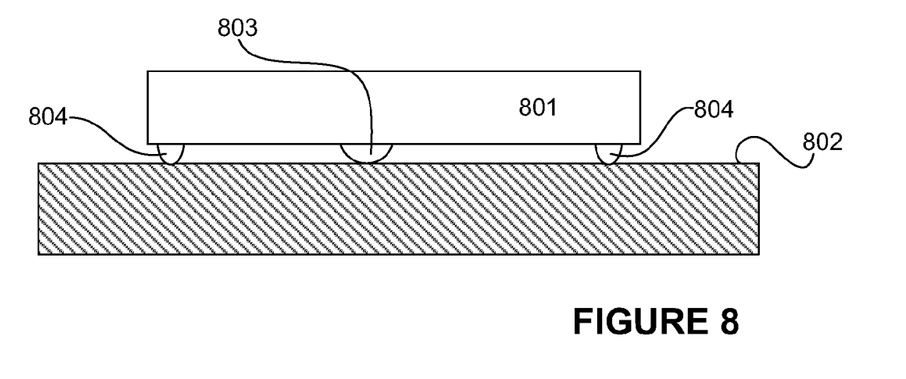
FIG. 8 illustrates a physical input device adapted to provide tactile feedback to a user.

In addition to manipulating the response of a UI depending on the perceived intentions of a user, the present disclosure also concerns methods of providing tactile feedback to a user via the physical input device to facilitate the user's ability to execute desired actions within the UI. For example, tactile feedback such as vibration or increased resistance to movement of the input device can inform a user when the selector is at the edge of a window or in an area of the display that might be undesirable. FIG. 8 illustrates one embodiment of this concept. Mouse 801 operates in a conventional manner, wherein movement along surface 802 actuates tracking ball 803. Alternatively, mouse 801 may be an optical mouse. Mouse 801 is adapted so that its ease of motion against surface 802 can change to provide feedback in accordance with a user's desired actions within the UI. For example, mouse 801 can be physically easier to move in such a way so as to execute a desired action, compared to an undesired action. Referring to FIG. 5 in conjunction with FIG. 8, mouse 801 may become very easy to move in the direction of icon 504 when the cursor is placed in proximity to gravity field 506. Conversely, mouse 801 may become difficult to move in the direction of icon 505 when the cursor is in proximity to anti-gravity field 507. Thus, a user perceives a physical barrier through the mouse to placing the cursor on icon 505.

According to one embodiment, mouse 801 includes feet 804 adapted to provide tactile feedback by changing the freedom of motion of mouse 801 against surface 802, depending on the user's desired action within the UI. Feet 804 may be actuated to grip surface 802 more firmly thereby increasing the friction of mouse 801 against surface 802, rendering mouse 801 more difficult to move. This increase in friction can be triggered to provide resistance to moving mouse 801 in a way so as to execute an undesired action within the UI. Feet 804 can be actuated mechanically or pneumatically, for example. Alternatively, the ease of movement of mouse 801 can be manipulated magnetically. Mouse 801 can include an electromagnet, the strength of which can be increased or decreased in response to the desired actions within the UI. Thus, the ease of movement of mouse 801 against surface 802 (which is metallic in this embodiment) increases or decreases to provide tactile feedback to the user. Tactile feedback can be implemented with other physical input devices such as joy sticks, roller balls, and the like. Any technique known in the art for providing artificial feel to an input device can be used, for example mechanical, magnetic techniques, and the like.

Physical tactile feedback can be instructive and/or corrective. A particularly useful environment for the tactile feedback methods described herein is drawing and designing applications such as CAD and the like. For example, tactile feed back can be used to give "weight" to certain objects making it more difficult to inadvertently move a "heavy" object while trying to move other "lighter" objects. In other words, the physical input device resists movement when trying to move a heavy object and thus more concentrated and particular effort must be expended to move such an object. As another example, many drawing applications include a "snap to" feature wherein lines and objects "snap to" other lines and objects or "snap to" gridlines. Using the disclosed tactile feedback features, a user receives tactile feedback cues when the objects snap to other objects or gridlines. A user may override the "snap to" feature by physically resisting the motion of the physical input device.

It will be appreciated that the above described systems and methods can be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. The scope of the invention is limited only by the following claims.

What we claim is:

1. A method of manipulating a cursor in a presentation area, the method comprising:
defining a speed relationship in a computing device relating movement of a control device operatively coupled to the computing device to movement of a cursor in a presentation area generated by the computing device;
defining a threshold state for the presentation area;
receiving at the computing device input indicative of an intended speed and an intended direction of the cursor from the control device;
determining with the computing device a current state for the presentation area indicative of designated items present in the intended direction of the cursor;
comparing with the computing device the current state to the threshold state;
altering the speed relationship based upon the intended cursor speed and based upon the comparison; and
displaying the cursor moving in the intended direction in the presentation area with the altered speed relationship.

2. The method of claim 1, wherein the presentation area comprises a screen or a software-generated display.

3. The method of claim 1, wherein the control device comprises a mouse, a scroll wheel, a click wheel, a joystick, a trackball, a roller ball, or one or more touch-sensitive surfaces.

4. The method of claim 1, wherein the cursor is selected from the group consisting of a cursor, a selector, a pointer, a bar, a finger, or a finger gesture.

5. The method of claim 1, wherein the current state comprises a current distance of the cursor to the designated items in the intended direction, wherein the threshold state comprises a threshold distance of the cursor, and wherein altering the speed relationship comprises altering the speed relationship based upon the current distance being greater than or less than the threshold distance.

6. The method of claim 1, wherein the current state comprises a current length of a list of the designated items in the intended direction, wherein the threshold state comprises a threshold length, and wherein altering the speed relationship comprises altering the speed relationship based upon the current length being greater than or less than the threshold length.

7. The method of claim 1, wherein the current state comprises a current quantity of the designated items in the intended direction, wherein the threshold state comprises a threshold quantity, and wherein altering the speed relationship comprises altering the speed relationship based upon the current quantity being less than or greater than the threshold quantity.

8. The method of claim 1, wherein altering the speed relationship comprises altering the speed relationship only when a user input indicates a contact or a gesture performed on one or more touch-sensitive surfaces.

9. The method of claim 1, further comprising providing feedback when the speed relationship is altered.

10. The method of claim 9, wherein the feedback includes tactile feedback provided by the control device.

11. The method of claim 10, wherein the tactile feedback includes resistance to the user manipulation of the control device.

12. The method of claim 1, wherein designating items in the presentation area comprises designating the items through an Application Programming Interface or user selection.

13. The method of claim 1, comprising designating the items based on popularity of the designated items.

14. The method of claim 13, wherein the popularity is determined according to how often the designated item has been previously selected.

15. The method of claim 1, wherein one or more of the designated items define an attractive or repulsive property to the cursor.

16. The method of claim 15, wherein determining comprises determining how many designated items in the presentation area in the indicated direction have the attractive or repulsive property, and wherein altering the speed relationship comprises increasing or decreasing the speed relationship based upon the determination.

17. A device-readable medium having program instructions stored thereon for causing a device to perform a method of manipulating a cursor in a presentation area according to claim 1.

18. An apparatus, comprising:
a first connection communicatively coupled to a control device;
a second connection communicatively coupled to a display device and outputting presented matter for display with the display device; and
a processor operatively coupled to the first and second connections, the processor moving a cursor in the presented matter based on a speed relationship defined between user manipulation of the control device and movement of the cursor in the presented matter, the processor receiving input indicative of an intended speed and an intended direction of the control device and determining a current state of the presentation area indicative of designated items are present in the intended direction of the cursor, the processor comparing the current state to a threshold state for the presentation area defined and altering the speed relationship based upon the intended speed and based upon the comparison.

* * * * *